(12) United States Patent
Jeong et al.

(10) Patent No.: US 12,142,786 B2
(45) Date of Patent: Nov. 12, 2024

(54) BATTERY MODULE AND BATTERY PACK

(71) Applicant: SK On Co., Ltd., Seoul (KR)

(72) Inventors: Ha Chul Jeong, Daejeon (KR); Min Song Kang, Daejeon (KR); Jae Hee Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/358,942

(22) Filed: Jul. 26, 2023

(65) Prior Publication Data

US 2024/0039111 A1    Feb. 1, 2024

(30) Foreign Application Priority Data

Jul. 29, 2022    (KR) .................. 10-2022-0094897

(51) Int. Cl.
*H01M 50/367*    (2021.01)
*H01M 10/658*    (2014.01)
*H01M 50/211*    (2021.01)

(52) U.S. Cl.
CPC ....... *H01M 50/367* (2021.01); *H01M 10/658* (2015.04); *H01M 50/211* (2021.01)

(58) Field of Classification Search
CPC . H01M 10/658; H01M 50/211; H01M 50/367
See application file for complete search history.

(56) References Cited

U.S. PATENT DOCUMENTS

| | | | |
|---|---|---|---|
| 11,522,228 B2 * | 12/2022 | Lin | ............... H01M 50/586 |
| 2021/0280336 A1 | 9/2021 | Turpin et al. | |
| 2023/0059778 A1 * | 2/2023 | Zagrodnik | .......... H01M 50/213 |

FOREIGN PATENT DOCUMENTS

| | | |
|---|---|---|
| JP | 2019-514191 A | 5/2019 |
| KR | 10-2017-0021547 A | 2/2017 |
| KR | 10-2019-0069131 A | 6/2019 |
| KR | 10-2021-0129512 A | 10/2021 |
| KR | 10-2022-0017741 A | 2/2022 |
| KR | 10-2022-0026928 A | 3/2022 |
| KR | 10-2023-0040123 A | 3/2023 |

* cited by examiner

*Primary Examiner* — Karie O'Neill Apicella
(74) *Attorney, Agent, or Firm* — IP & T GROUP LLP

(57) ABSTRACT

The battery module according to the present disclosure comprises a plurality of battery cells stacked in one direction; a module case accommodating the plurality of battery cells; and a vent positioned on top of the plurality of battery cells, wherein the vent comprises a plurality of partitions forming a plurality of flow channels distinguished from each other.

19 Claims, 12 Drawing Sheets

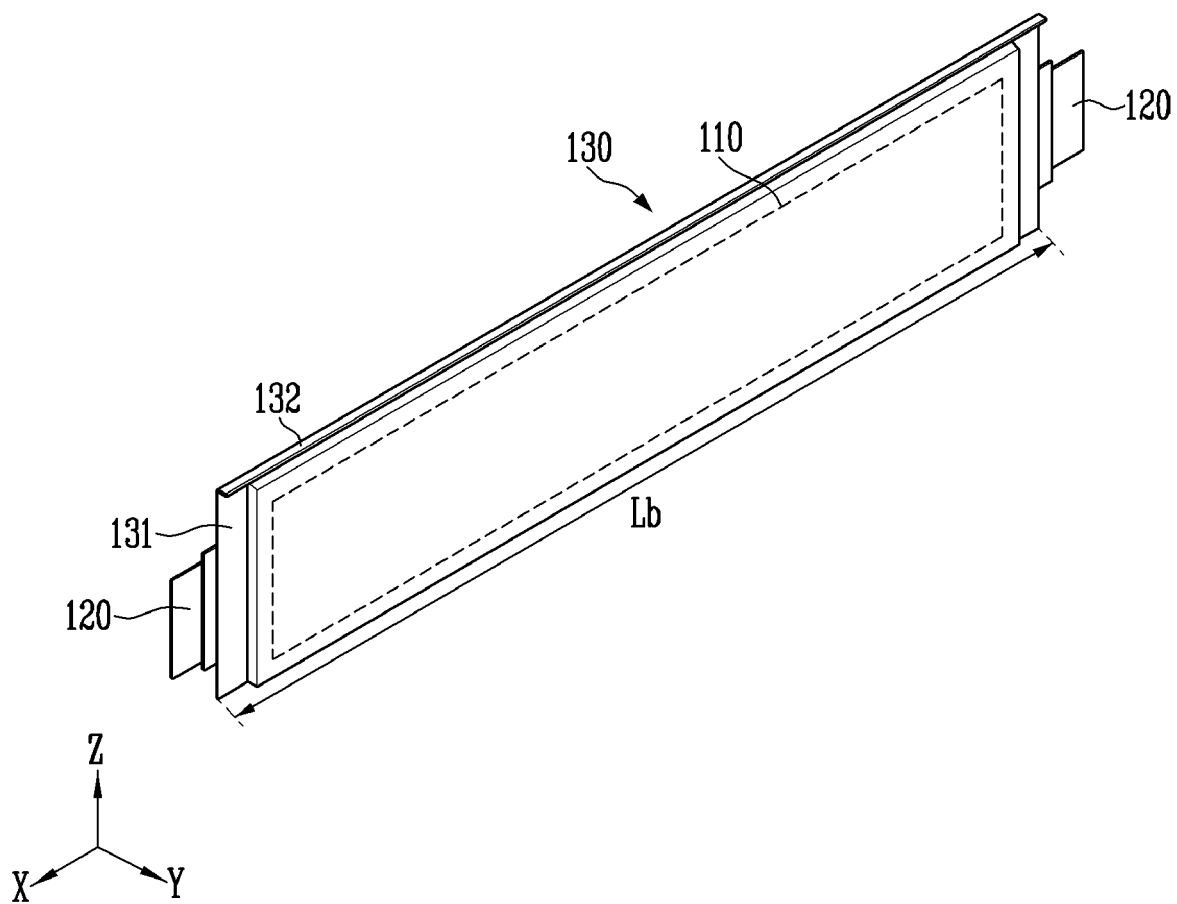

BATTERY MODULE AND BATTERY PACK

CROSS-REFERENCE TO RELATED PATENT APPLICATION

The present application claims priority under 35 U.S.C. § 119(a) to Korean patent application number 10-2022-0094897 filed on Jul. 29, 2022, in the Korean Intellectual Property Office, the entire disclosure of which is incorporated by reference herein.

BACKGROUND OF THE INVENTION

1. Field

The present disclosure relates to a secondary battery, specifically, to a battery module and a battery pack.

2. Description of the Related Art

As an energy power source for driving various electronic devices such as smartphones, laptops, vehicles, and drones, demand for secondary batteries is rapidly increasing.

In particular, as secondary batteries for driving vehicles and the like, research on battery modules and battery packs is being actively conducted. A battery pack may comprise one or more battery modules. A battery module may comprise one or more battery cells. A battery cell may represent a minimum unit of a battery.

Meanwhile, due to an explosive reaction inside the battery cell, gas, flame, electrode foreign matter, etc. (hereinafter referred to as 'gas or the like') may be generated. Heat propagation through the gas or the like may induce ignition of adjacent battery cells. Therefore, a method of effectively discharging gas or the like to the outside and minimizing heat propagation to adjacent battery cells has been sought.

SUMMARY OF THE INVENTION

An embodiment of the present disclosure provides a battery module and a battery pack with improved battery cell stability.

The battery module and the battery pack, according to the present disclosure, may be widely applied in the field of green technology such as an electric vehicle (EV), a battery charging station, an energy storage system (ESS), and solar power or wind power generation using batteries, wind power generation. In addition, the battery module and the battery pack, according to the present disclosure, may be used for eco-friendly mobility including electric vehicles and hybrid vehicles to mitigate climate change by regulating air pollution and greenhouse gas emissions.

A battery module according to an embodiment may comprise a plurality of battery cells stacked in one direction; a module case accommodating a plurality of battery cells; and a vent positioned on top of a plurality of battery cells. A vent may comprise a plurality of partitions forming a plurality of flow channels distinguished from each other.

In an embodiment, a battery module may further comprise a plurality of thermal barriers respectively disposed between adjacent battery cells among a plurality of battery cells.

In an embodiment, each of a plurality of thermal barriers may be disposed at a bottom of a corresponding partition among a plurality of partitions.

In an embodiment, at least one battery cell among a plurality of battery cells may be disposed between adjacent thermal barriers among a plurality of thermal barriers.

In an embodiment, each of a plurality of battery cells may comprise a sealing portion to which an exterior material is bonded and which is folded, and each of a plurality of battery cells may be disposed such that a sealing portion faces a vent.

In an embodiment, each of a plurality of partitions may have a height of 5 mm or more in a direction that is perpendicular to one direction.

In an embodiment, a vent may comprise a lower plate connected to each of a plurality of partitions in a direction that is perpendicular to each of a plurality of partitions, and a lower plate may comprise at least one hole for each of a plurality of flow channels.

In an embodiment, any one flow channel among a plurality of flow channels may discharge to the outside a gas introduced from a battery cell corresponding to any one flow channel among a plurality of battery cells.

In an embodiment, any one flow channel among a plurality of flow channels may not be connected to another flow channel among a plurality of flow channels within a vent. Therefore, any one flow channel among a plurality of flow channels may be formed within a vent to be separated from another flow channel among a plurality of flow channels.

In an embodiment, a plurality of flow channels may extend in a direction that is different from the direction in which a plurality of battery cells are stacked.

In an embodiment, the module case may comprise an upper case and a lower case, and a vent may be coupled to an upper case as an integrated component.

A battery pack according to an embodiment may comprise a plurality of battery modules each comprising a plurality of cells stacked in one direction and a vent positioned on top of a plurality of battery cells; and a pack housing accommodating a plurality of battery modules. A vent may comprise a plurality of partitions forming a plurality of flow channels distinguished from each other, and a pack housing may comprise an exhaust passage connected to each of a plurality of flow channels.

In an embodiment, any one flow channel among a plurality of flow channels may discharge to the outside through an exhaust passage a gas introduced from a corresponding battery cell among a plurality of battery cells.

In an embodiment, an exhaust passage may comprise a first exhaust passage connected to each of a plurality of flow channels and a second exhaust passage connected in a direction that is perpendicular to a first exhaust passage. A gas generated in any one battery cell among a plurality of battery cells may be discharged to the outside by sequentially passing through a flow channel corresponding to any one battery cell among a plurality of flow channels, a first exhaust passage, and a second exhaust passage.

In an embodiment, a pack housing may comprise a frame forming a space in which each of a plurality of battery modules is accommodated. In addition, an exhaust passage may be formed by a frame.

An embodiment of the present disclosure may provide a battery module and a battery pack with improved battery cell stability.

In an embodiment of the present disclosure, a gas generated from a battery cell can be effectively discharged to the outside.

An embodiment of the present disclosure may reduce the occurrence of secondary ignition by heat propagation.

An embodiment of the present disclosure may improve space efficiency of a battery module by discharging gas or the like by using an upper space within a battery module.

BRIEF DESCRIPTION OF THE DRAWINGS

FIG. 3 is a diagram for explaining a battery cell according to an embodiment.

DETAILED DESCRIPTION

Structural or functional descriptions of Examples disclosed in the present specification or application are merely illustrated for the purpose of describing Examples according to the technical principle of the present disclosure. In addition, Examples according to the technical principle of the present disclosure may be implemented in various forms other than the Examples disclosed in the present specification or application. In addition, the technical principle of the present disclosure is not to be construed as being limited to the Examples described in this specification or application.

Figure 1:
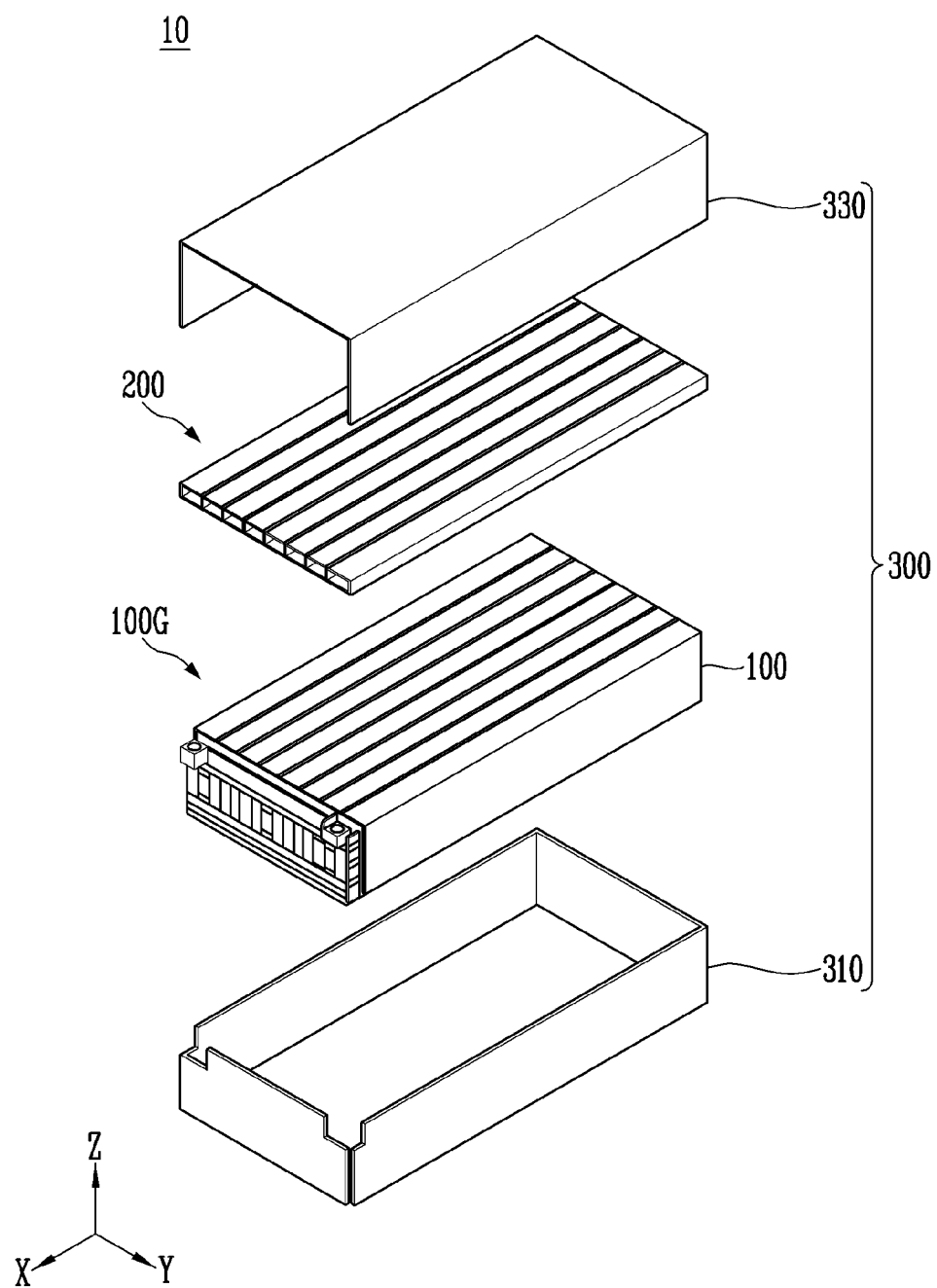
FIG. 1 is a diagram for explaining a battery module according to an embodiment.

FIG. 1 is a diagram for explaining a battery module according to an embodiment.

Referring to FIG. 1, a battery module 10 may comprise a battery cell stack 100G, a vent 200, and a module case 300.

A battery cell stack 100G may comprise a battery cell 100. A battery cell 100 may comprise an electrode assembly, an exterior material, and an electrode tab. An exterior material may surround an electrode assembly. An electrode and an electrode tab of an electrode assembly may be electrically connected by contacting with each other with a same polarity. A portion of an electrode tab may be exposed to the outside of an exterior material. For example, a portion of an electrode tab may protrude in the X-axis direction. An electrode tab of a battery cell 100 may be electrically connected to an electrode tab of another battery cell 100 through a bus bar.

The number of battery cells 100 may be plural. A plurality of battery cells may be stacked in one direction. For example, a direction in which a plurality of battery cells are stacked may be the Y-axis direction. In an embodiment, a direction in which a plurality of battery cells are stacked may be a direction that is perpendicular to a direction in which an electrode tab protrudes. For example, a direction in which an electrode tab protrudes may be in the X-axis direction.

A vent 200 may be positioned on top of a battery cell stack 100G. A vent 200 may discharge to the outside gas, flame, electrode foreign matter, etc. (hereinafter referred to as 'gas or the like') generated in a battery cell 100. According to an embodiment of the present disclosure, since a vent 200 is disposed in an upper space within a battery module 10, volume loss of a battery module 10 may be reduced. Therefore, space efficiency within a battery module 10 may be improved.

A module case 300 may accommodate a battery cell stack 100G. For example, a module case 300 may form an accommodating space therein. A battery cell stack 100G may be disposed in an accommodation space.

In an embodiment, a module case 300 may comprise a lower case 310 and an upper case 330. A lower case 310 may be positioned at a bottom of a battery cell stack 100G. A lower case 310 may support a battery cell stack 100G. An upper case 330 may be positioned on top of a vent 200. In an embodiment, a vent 200 may be manufactured as a component that is independent from an upper case 330 or as an integrated component coupled to an upper case 330. When a vent 200 is manufactured as an independent component, a vent 200 may be coupled to an upper case 330 through a method such as bolt, clamp, or adhesive.

A lower case 310 and an upper case 330 may be coupled to each other. In an embodiment, side plates surrounding side faces of a battery cell stack 100G may be coupled to each of a lower case 310 and an upper case 330. Each of side plates may be positioned on an outer face of a battery cell stack 100G. For example, an outer face of a battery cell stack 100G may be an XZ plane or a YZ plane among surfaces of a battery cell stack 100G. In an embodiment, a side plate may be manufactured as component that is independent from a lower case 310 and an upper case 330, or as an integrated component coupled to at least one among a lower case 310 and an upper case 330. When a side plate is manufactured as an independent component, a side plate may be coupled to a lower case 310 and an upper case 330 through a method such as bolt and clamp.

Hereinafter, embodiments of the present disclosure will be described in more detail with reference to the accompanying drawings.

Figure 2A:
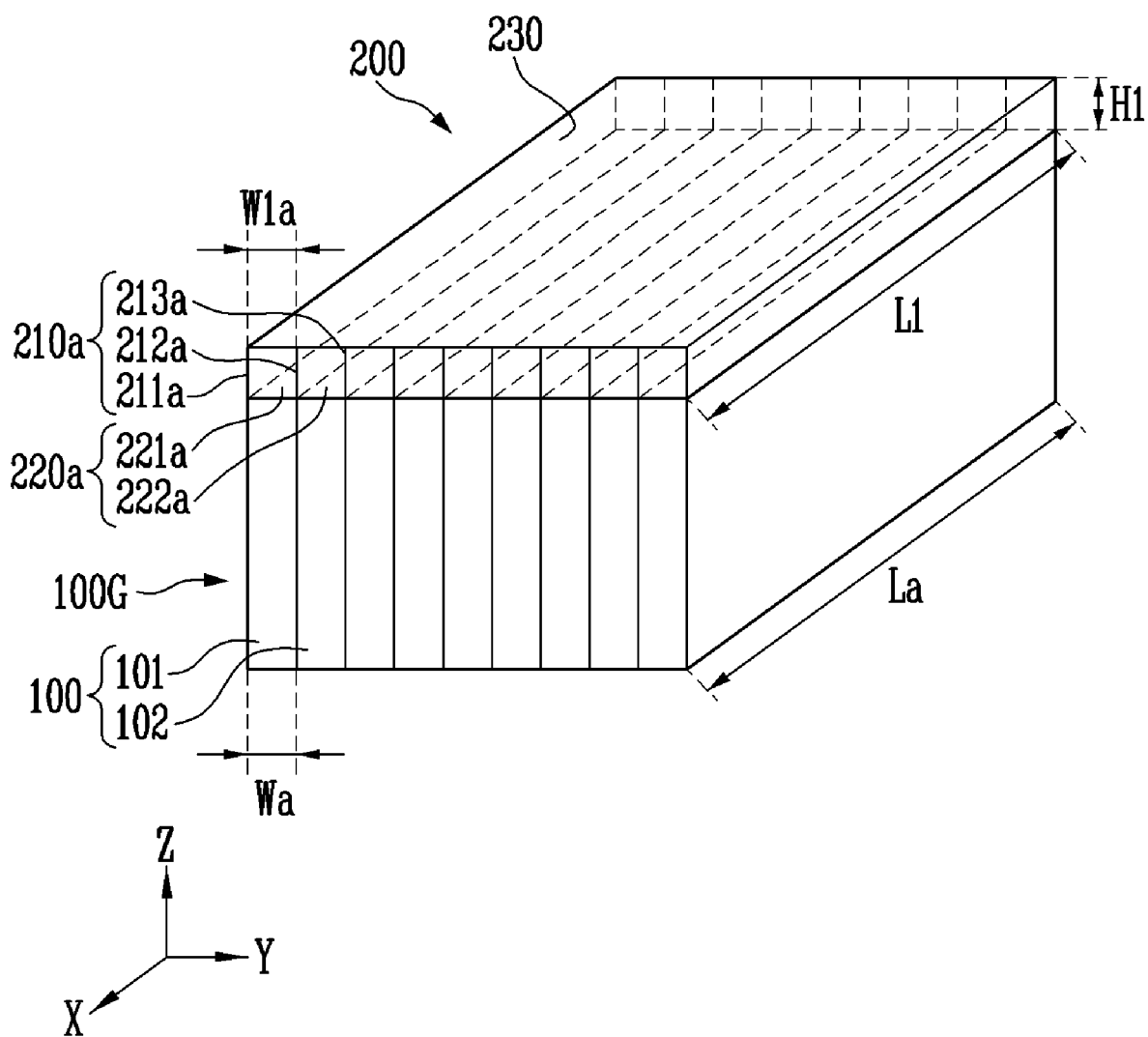
FIGS. 2A and 2B are diagrams for explaining a vent according to an embodiment.
Figure 2B:
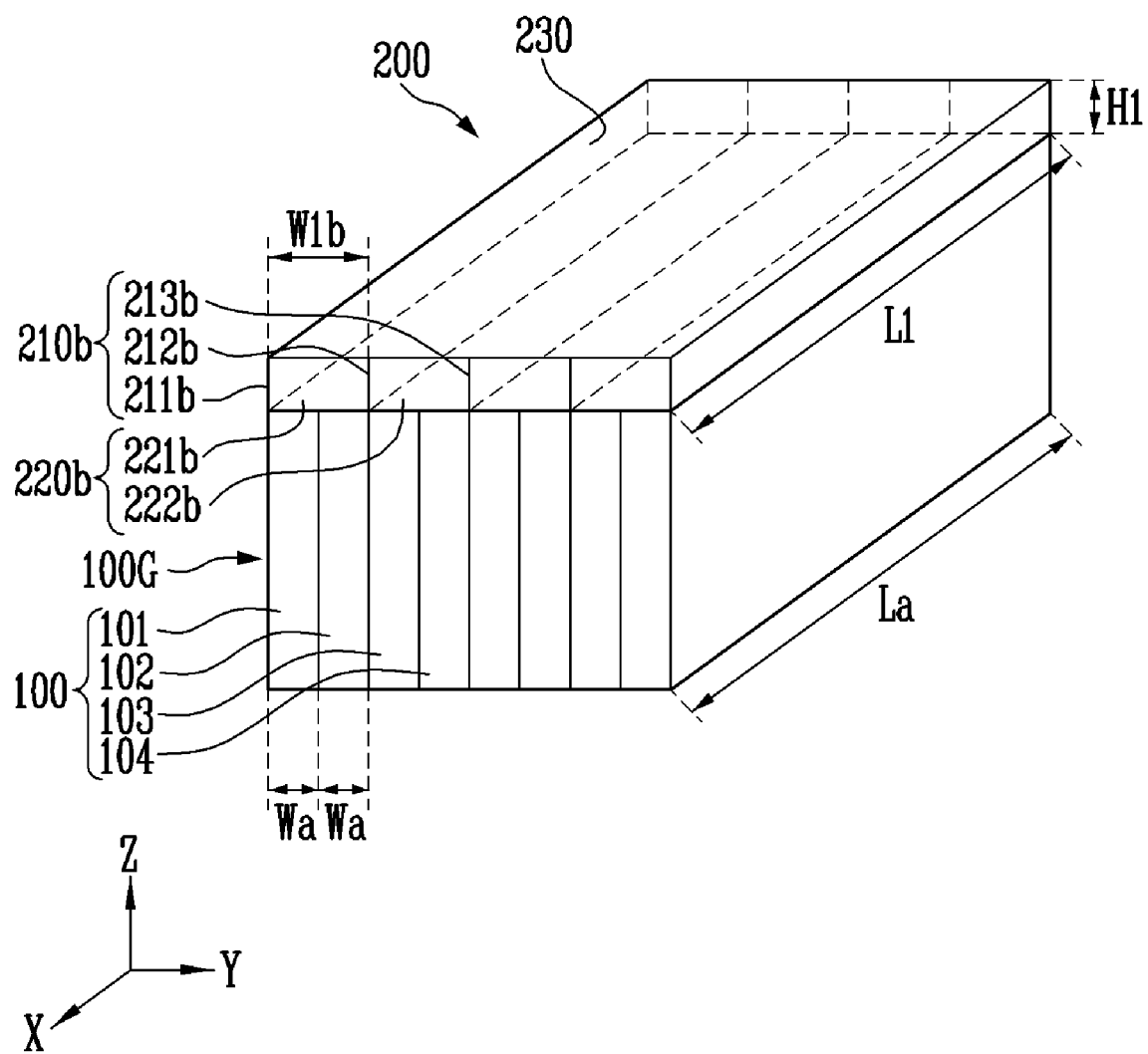

FIGS. 2A and 2B are diagrams for explaining a vent according to an embodiment.

Referring to FIGS. 2A and 2B, a vent 200 may be disposed on top of a battery cell stack 100G. Therefore, a vent 200 may be disposed on top of the battery cell 100.

A vent 200 may comprise partitions 210a, 210b. In an embodiment, a vent 200 may further comprise an upper plate 230. At a bottom of an upper plate 230, a plurality of partitions 210a, 210b may be formed to extend in the −Z-axis direction. An upper plate 230 may support a plurality of partitions 210a, 210b. A plurality of partitions 210a, 210b may be spaced apart from each other. The distance between a plurality of partitions 210a, 210b may be the same within an error range. In an embodiment, an upper plate 230 may be replaced with an upper case 330.

Partitions 210a, 210b may form flow channels 220a, 220b. Flow channels 220a, 220b may be defined as spaces between two adjacent partitions 210a, 210b. For example, a first flow channel 221a, 221b may be a space between a first partition 211a, 211b and a second partition 212a, 212b that are adjacent to each other, and a second flow channel 222a, 222b may be a space between a second partition 212a, 212b and a third partition 213a, 213b that are adjacent to each other.

In an embodiment, any one flow channel among a plurality of flow channels 220a, 220b may not be connected to another flow channel in a vent 200. In other words, a flow channel 220a, 220b may not communicate with each other by partitions 210a, 210b. For example, a first flow channel 221a, 221b and a second flow channel 222a, 222b may be divided into independent spaces by a second partition 212a, 212b.

A flow channel 220a, 220b may be positioned on top of a corresponding battery cells 100. The number of battery cells 100 corresponding to one flow channel 220a, 220b may be one or more. In other words, the number of flow channels 220a and the number of battery cells 100 may have a corresponding relation of 1:N. Here, N is a natural number equal to or greater than 1.

In an embodiment, the height H1 of a partition 210a, 210b or a flow channel 220a, 220b may be equal to or greater than a reference value. The height H1 may be a length in the Z-axis direction. The Z-axis direction may be a direction that is perpendicular to the Y-axis direction, which is a stacking direction of battery cells 100. For example, a reference value may be 1 mm. However, this is only an example, and a reference value may be modified to various values such as 2 mm and 3 mm. Accordingly, a sufficient space of a flow channel 220a, 220b can be secured to effectively discharge a gas generated from a battery cell 100.

In an embodiment, the horizontal length L1 of a partition 210a, 210b or a flow channel 220a, 220b may be equal to or greater than the horizontal length La of a battery cell 100. The horizontal length L1, La may be a length in the X-axis direction. For example, the horizontal length of a second partition 212a, 212b may be equal to or greater than the horizontal length of a battery cell 100. Accordingly, a second partition 212a, 212b may form a first flow channel 221a, 221b and a second flow channel 222a, 222b as independent spaces distinguished from each other.

In an embodiment, referring to FIG. 2A, the number of flow channels 220a and the number of battery cells 100 may have a corresponding relation of 1:1. In this case, a first flow channel 221a may be positioned on top of a first battery cell 101, and a second flow channel 222a may be positioned on top of a second battery cell 102.

To this end, the width length of a flow channel 220a may be the same as the width length of a battery cell 100 within an error range. The width length of a flow channel 220a may be the distance between partitions 210a. Here, the width length may be a length in the Y-axis direction. For example, the width length W1a of a first flow channel 221a may be the distance between a first partition 211a and a second partition 212a. In this case, a difference between the width length W1a of a first flow channel 221a and the width length Wa of a first battery cell 101 may be equal to or less than a reference value. A reference value may be a value set as an error range.

A first flow channel 221a may discharge to the outside a gas introduced from a first battery cell 101. Therefore, a gas or the like introduced into a first flow channel 221a may be discharged to the outside through a first flow channel 221a without passing through a second flow channel 222a. In the same manner, a second flow channel 222a may discharge to the outside a gas introduced from a second battery cell 102.

In an embodiment, referring to FIG. 2B, the number of flow channels 220b and the number of battery cells 100 may have a corresponding relation of 1:2. In this case, a first flow channel 221b may be positioned on top of a first battery cell 101 and a second battery cell 102, and a second flow channel 222b may be positioned on top of a third battery cell 103 and a fourth battery cell 104.

To this end, the width length of a flow channel 220b may be equal to a value obtained by multiplying the width length of a battery cell 100 by the number of battery cells 100 within an error range. Here, the width length may be a length in the Y-axis direction. The width of a flow channel 220b may be the distance between partitions 210b. For example, the width length W1b of a first flow channel 221b may be the distance between a first partition 211b and a second partition 212b. In this case, the difference between the sum of the width length Wa of a first battery cell 101 and the width length Wa of a second battery cell 102; and the width length W1b of a first flow channel 221b may be equal to or less than a reference value. A reference value may be a value set as an error range.

A first flow channel 221b may discharge to the outside a gas introduced from a first battery cell 101 or a second battery cell 102. Therefore, a gas or the like introduced into a first flow channel 221b may be discharged to the outside through a first flow channel 221a without passing through a second flow channel 222b. In the same manner, a second flow channel 222b may discharge to the outside a gas introduced from a third battery cell 103 or a fourth battery cell 104.

According to an embodiment of the present disclosure, through a plurality of flow channels 220a, 220b distinguished from each other, transfer by a gas or the like generated in a battery cell 100 to an adjacent battery cell may be suppressed. Accordingly, occurrence of secondary ignition of adjacent battery cells due to heat propagation may be reduced. In addition, a gas generated from a battery cell 100 can be effectively discharged to the outside.

Meanwhile, hereinafter, for convenience of explanation, description will be provided by assuming a vent 200 having a corresponding relationship of 1:2 between the number of flow channels 220b and the number of battery cells 100, as shown in FIG. 2B.

FIG. 3 is a diagram for explaining a battery cell according to an embodiment.

Referring to FIG. 3, a battery cell 100 according to one embodiment may be a pouch-type secondary battery. A pouch type may be a secondary battery using a flexible material or a material having flexible properties as an exterior material 130.

A battery cell 100 may comprise an electrode assembly 110, an electrode tab 120, and an exterior material 130.

The electrode assembly 110 may comprise a cathode, an anode, a separator, and an electrolyte. An anode and a cathode may be alternately stacked. A separator may be disposed between an anode and a cathode.

An anode may comprise an anode current collector and an anode active material. An anode active material may be a material capable of intercalating and deintercalating lithium ions. For example, an anode active material may be any one of carbon-based materials such as crystalline carbon, amorphous carbon, carbon composite, and carbon fiber, lithium alloy, silicon (Si), and tin (Sn). A cathode may comprise a cathode current collector and a cathode active material. A cathode active material may comprise a material capable of intercalating and deintercalating lithium ions. A cathode active material may be a lithium metal oxide.

A separator may block an electrical contact between an anode and a cathode. A separator may have pores formed therein to allow ions such as lithium ions to pass therethrough. An electrolyte may comprise a material functioning as a medium to help the migration of ions such as lithium ions.

An electrode tab 120 may comprise a cathode tab electrically connected to a cathode of an electrode assembly 110 and an anode tab electrically connected to an anode of an electrode assembly 110.

A portion of an electrode tab 120 may protrude toward the outside. For example, a portion of a cathode tab may protrude in the +X-axis direction, and a portion of an anode tab may protrude in the −X-axis direction.

An exterior material 130 may surround an electrode assembly 110. An exterior material 130 may protect an electrode assembly 110. Specifically, an electrode assembly 110 may be accommodated in an inner space formed by an exterior material 130.

An exterior material 130 may comprise a sealing portion 131, 132. A sealing portion 131, 132 may be formed by being bonded in various ways such as adhesive, heating, and compression. A sealing portion 131, 132 may comprise a first sealing portion 131 and a second sealing portion 132.

A first sealing portion 131 may be an area where an exterior material 130 is bonded along the circumference of an electrode assembly 110. A second sealing portion 132 is an area connected to a first sealing portion 131 and may be positioned on top of a first sealing part 131. A second sealing portion 132 may be fixed in a folded state.

In an embodiment, the horizontal length La of a battery cell 100 described with reference to FIGS. 2A and 2B may be defined as the length Lb between both ends of an exterior material 130 or as the length between both ends of an electrode tab 120.

Figure 4:
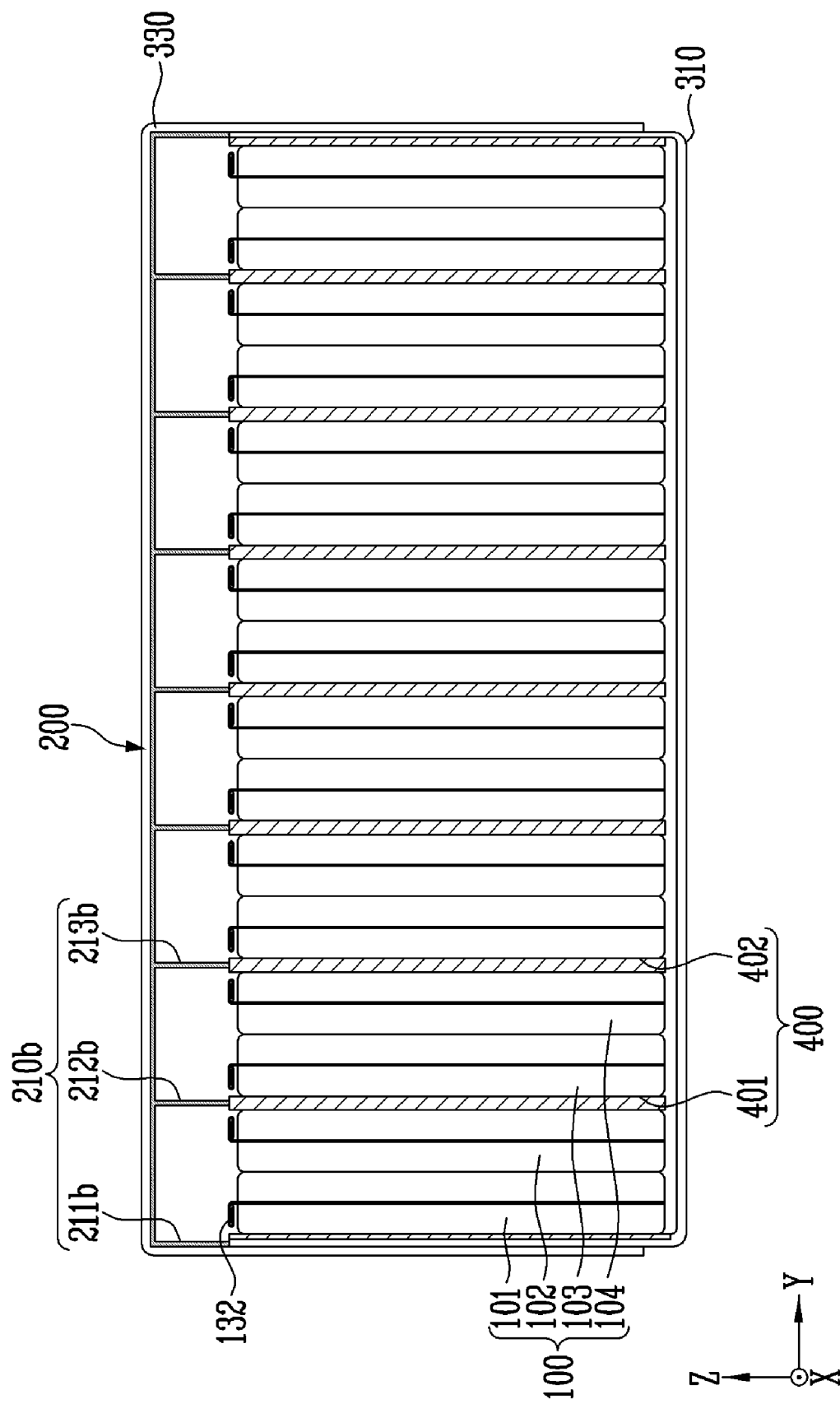
FIGS. 4 and 5 are diagrams for explaining one cross-section of a battery module according to an embodiment.
Figure 5:
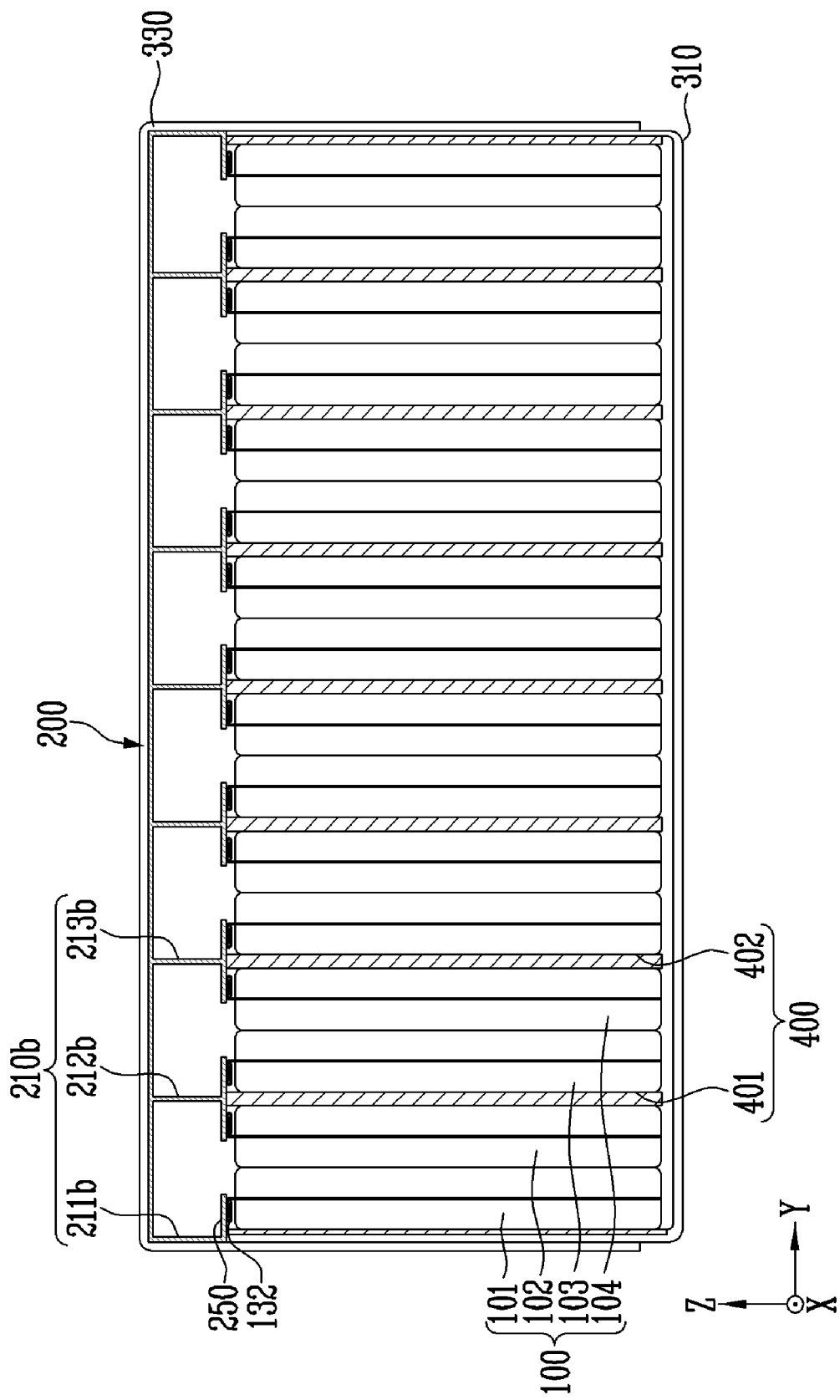

FIGS. 4 and 5 are diagrams for explaining one cross-section of a battery module according to an embodiment. FIGS. 4 and 5 show a cross-section of a battery module 10 with respect to the YZ plane when battery cells 100 are stacked in the Y-axis direction.

Referring to FIGS. 4 and 5, a battery module 10 according to an embodiment may comprise a plurality of battery cells 100 and a vent 200 accommodated in an inner space formed by a lower case 310 and an upper case 330. A vent 200 may be positioned on top of a plurality of battery cells 100.

A battery module 10 according to an embodiment may further comprise a thermal barrier 400. A thermal barrier 400 may comprise a material having low thermal conductivity and thus having insulating properties. In addition, a thermal barrier 400 may comprise a material having heat resistance or fire resistance that can withstand high heat or flame. For example, a thermal barrier 400 may comprise at least one material such as silicate, mica, glass fiber, mineral fiber, and the like.

A thermal barrier 400 may be disposed between adjacent battery cells among a plurality of battery cells 100. For example, a first thermal barrier 401 may be disposed between a second battery cell 102 and a third battery cell 103 that are adjacent to each other.

Meanwhile, at least one battery cell among a plurality of battery cells 100 may be disposed between adjacent thermal barriers among a plurality of thermal barriers 400. For example, a third battery cell 103 and a fourth battery cell 104 may be disposed between a first thermal barrier 401 and a second thermal barrier 402 that are adjacent to each other. In an embodiment, the number of battery cells 100 disposed between a first thermal barrier 401 and a second thermal barrier 402 that are adjacent to each other may be variously modified.

In an embodiment, a thermal barrier 400 may be disposed at a bottom of a corresponding partitions among a plurality of partitions 210b. Therefore, a partition 210b may be disposed on top of a corresponding thermal barrier among a plurality of thermal barriers 400. For example, a first thermal barrier 401 may be disposed at a bottom of a second partition 212b, and a second thermal barrier 402 may be disposed at a bottom of a third partition 213b. In this case, an adhesive member may be filled each between a first thermal barrier 401 and a partition 212b and between a second thermal barrier 402 and a third partition 213b. An adhesive member may comprise a material having heat resistance or fire resistance.

In an embodiment, a battery cell 100 may comprise a second sealing portion 132 to which the exterior material 130 is bonded and which is folded. A battery cell 100 may be disposed in an inner space formed by a lower case 310 and an upper case 330 such that a second sealing portion 132 faces a vent 200.

Referring to FIG. 5, a vent 200 according to an embodiment may further comprise a lower plate 250.

A lower plate 250 may be connected to each of a plurality of partitions 210b in a direction that is perpendicular to each of a plurality of partitions 210b. For example, a lower plate 250 may be connected to a bottom of each of a plurality of partitions 210b.

A lower plate 250 may comprise at least one hole for each of a plurality of flow channels. Here, a hole may be a penetrated area in a lower plate 250.

Meanwhile, a vent 200 of the present disclosure may be implemented as a structure comprising a lower plate 250 having a hole, as shown in FIG. 5 or as a structure in which a lower plate 250 is omitted, as shown in FIG. 4.

Figure 6:
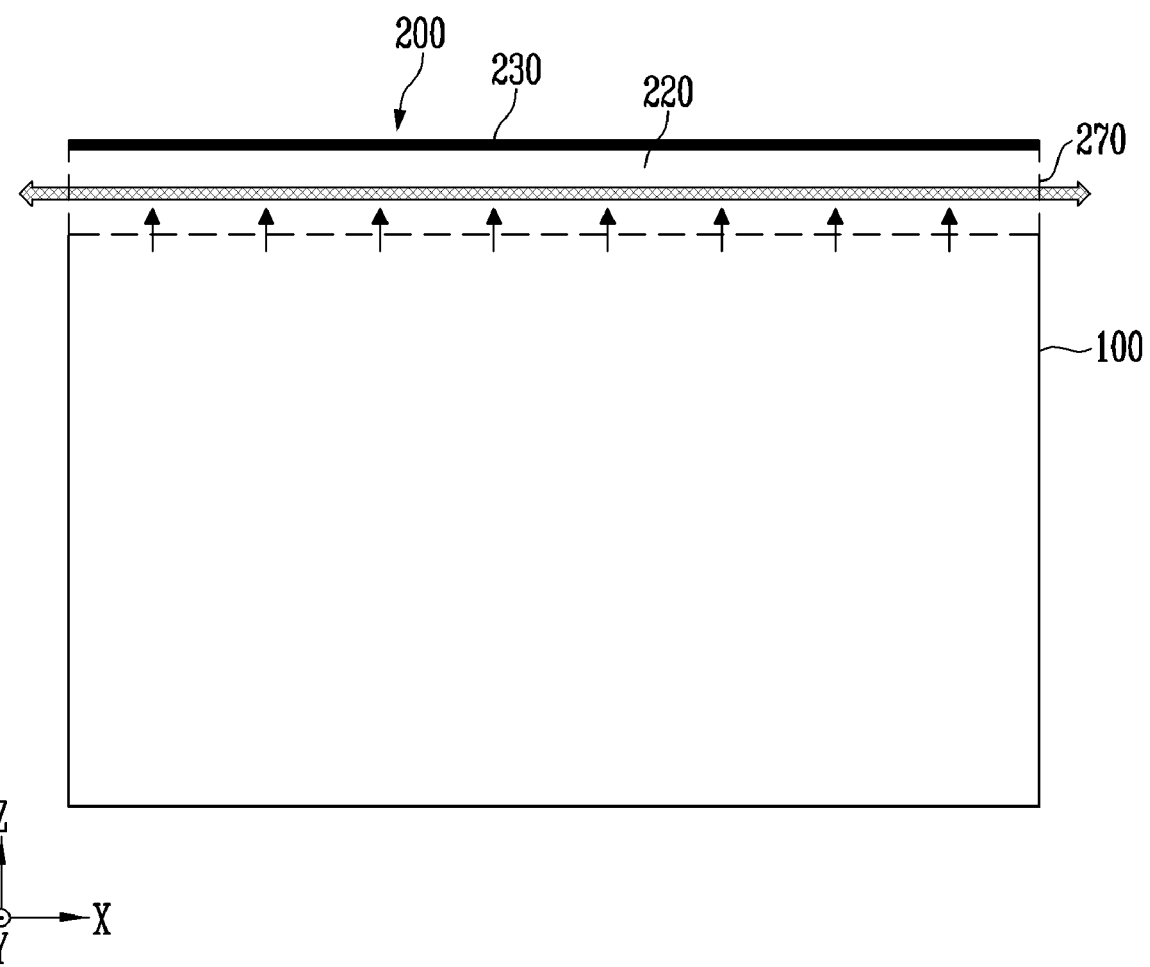
FIGS. 6 to 8 are diagrams for explaining other cross-sections of a battery module according to an embodiment.
Figure 7:
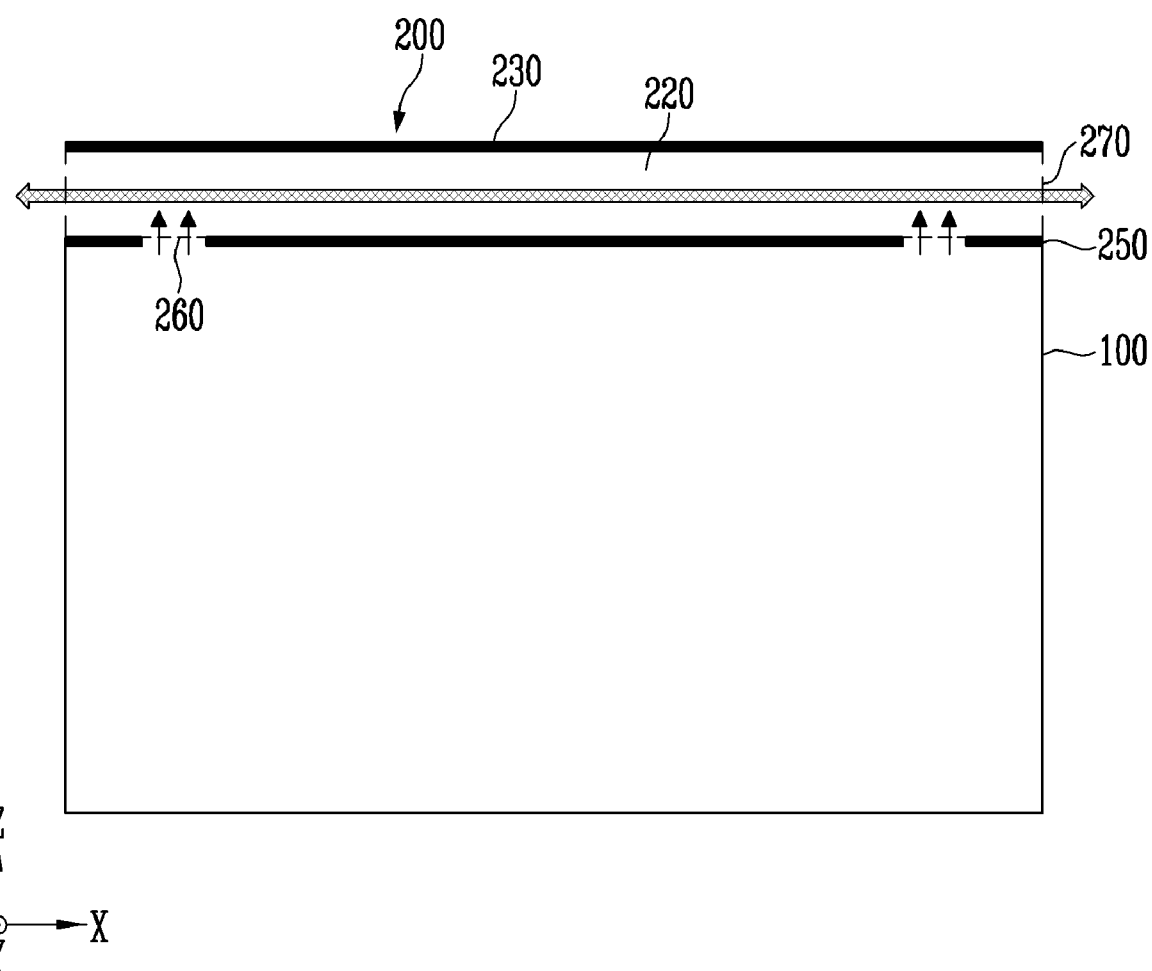
Figure 8:
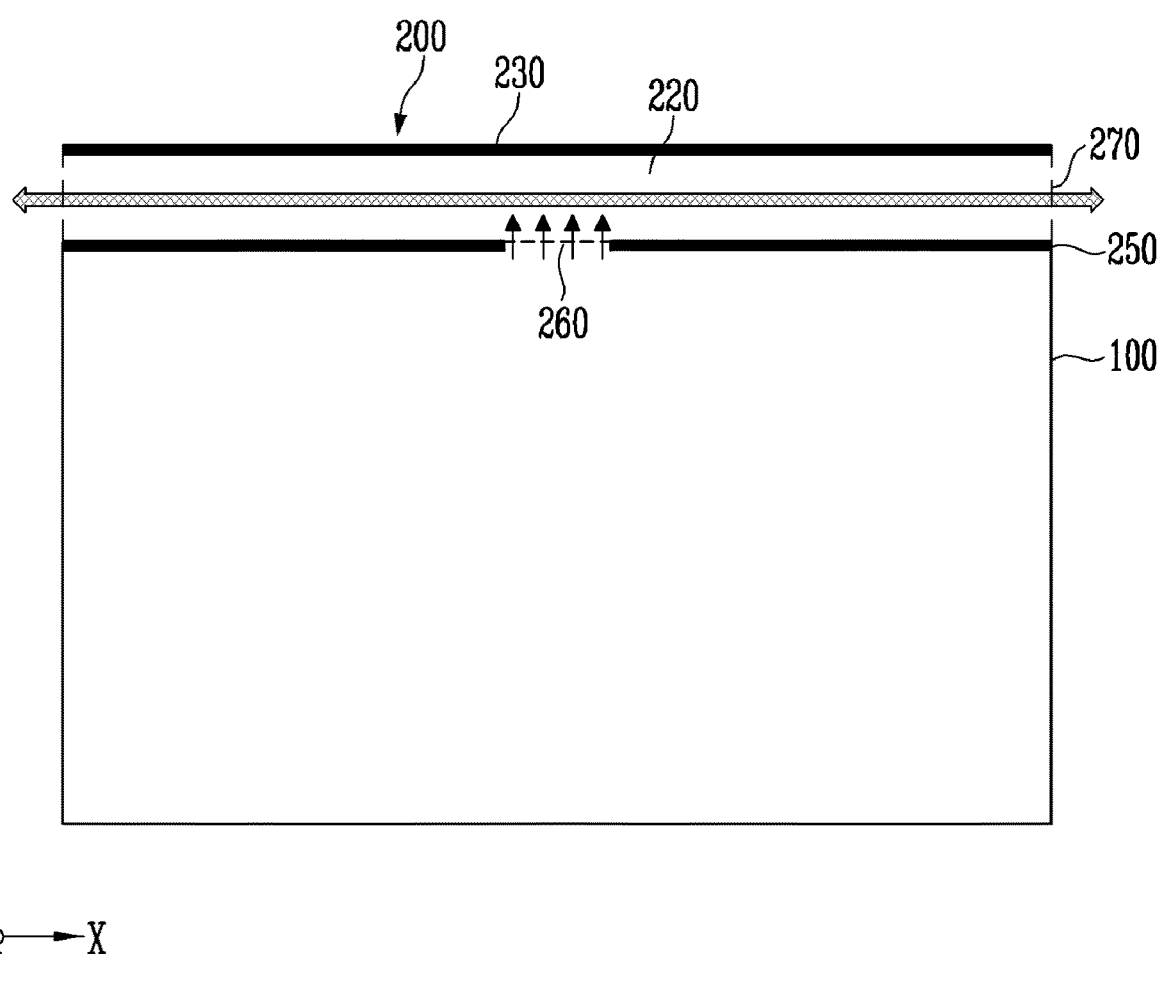

FIGS. 6 to 8 are diagrams for explaining other cross-sections of a battery module according to an embodiment. FIGS. 6 to 8 show cross-sections of a battery module 10 with respect to the XZ plane when battery cells 100 are stacked in the Y-axis direction.

Referring to FIGS. 4 and 6, a vent 200 may comprise a partition 210b and an upper plate 230. A flow channel 220 may be formed by a partition 210b and an upper plate 230. For example, a flow channel 220 may be a space with a partition 210b, an upper plate 230, and the battery cell 100 as a boundary.

A gas or the like may be generated inside a battery cell 100 due to an external shock or the like. When an exterior material 130 of a battery cell 100 is damaged due to gas pressure or physical damage, a gas inside a battery cell 100 may be ejected to the outside. In this case, a gas ejected from a battery cell 100 may flow into a flow channel 220 positioned on top of a battery cell 100, as indicated by an arrow. A gas introduced into a flow channel 220 may be discharged to the outside through an outlet 270. An outlet 270 may be formed at both ends of a flow channel 220 formed in the X-axis direction. Meanwhile, the position and the number of outlets 270 may be variously modified and implemented. For example, an outlet 270 may be formed at an upper plate 230.

Referring to FIGS. 5, 7, and 8, a vent 200 may comprise a partition 210b, an upper plate 230, and a lower plate 250. A channel 220 may be formed by a partition 210b, an upper plate 230, and a lower plate 250. For example, a flow channel 220 may be a space with a partition 210b, an upper plate 230, and a lower plate 250 as a boundary.

Meanwhile, a hole 260 may be formed at a lower plate 250. A hole 260 may be a boundary area between a battery cell 100 and a flow channel 220. Therefore, a gas generated from a battery cell 100 may flow into a flow channel 220 through a hole 260.

In an embodiment, a hole 260 may have various shapes such as a circle, an ellipse, or a polygon such as a triangle, a rectangle, and a pentagon.

In an embodiment, the position and the number of holes 260 may be variously modified. For example, as shown in FIG. 7, holes 260 may be each formed at positions close to both ends of a lower plate 250. For another example, as shown in FIG. 8, a hole 260 may be formed at the center of a lower plate 250.

Figure 9:
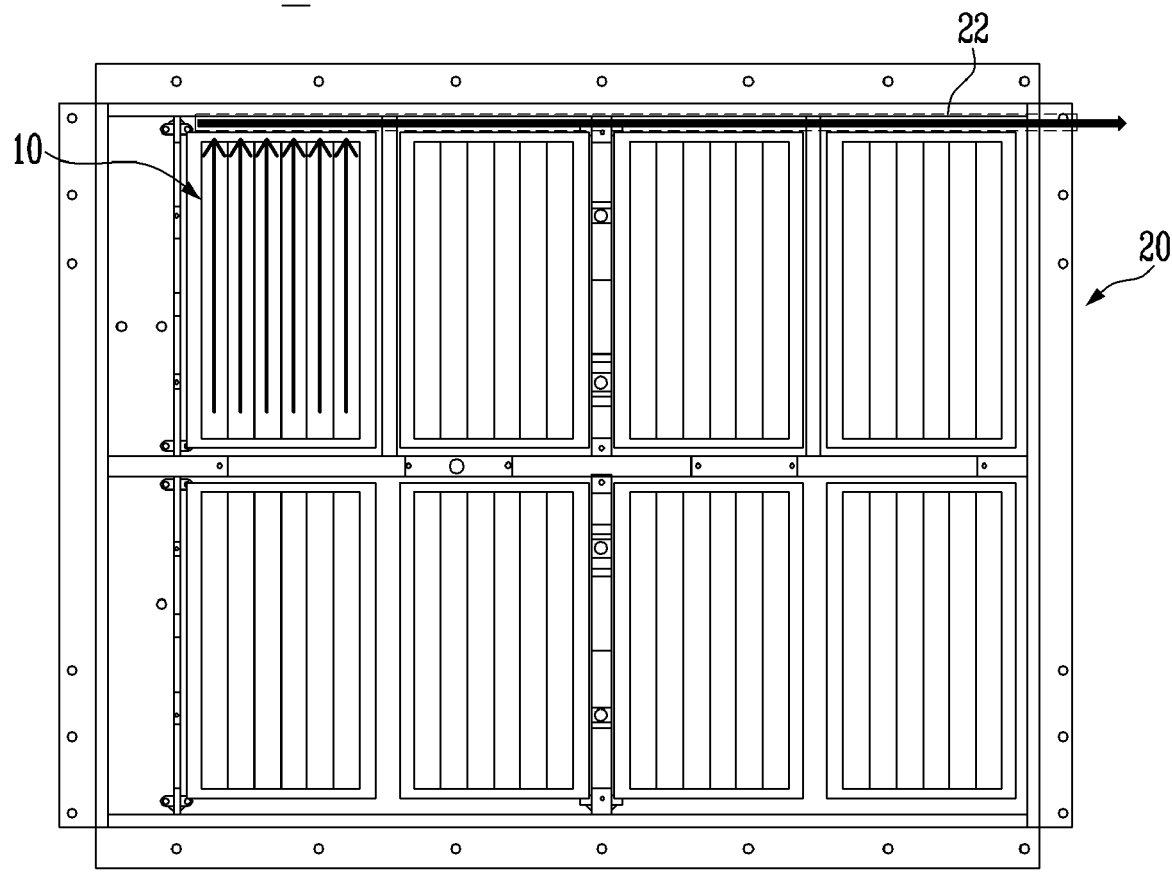
FIG. 9 is a diagram for explaining a battery pack according to an embodiment.
Figure 10:
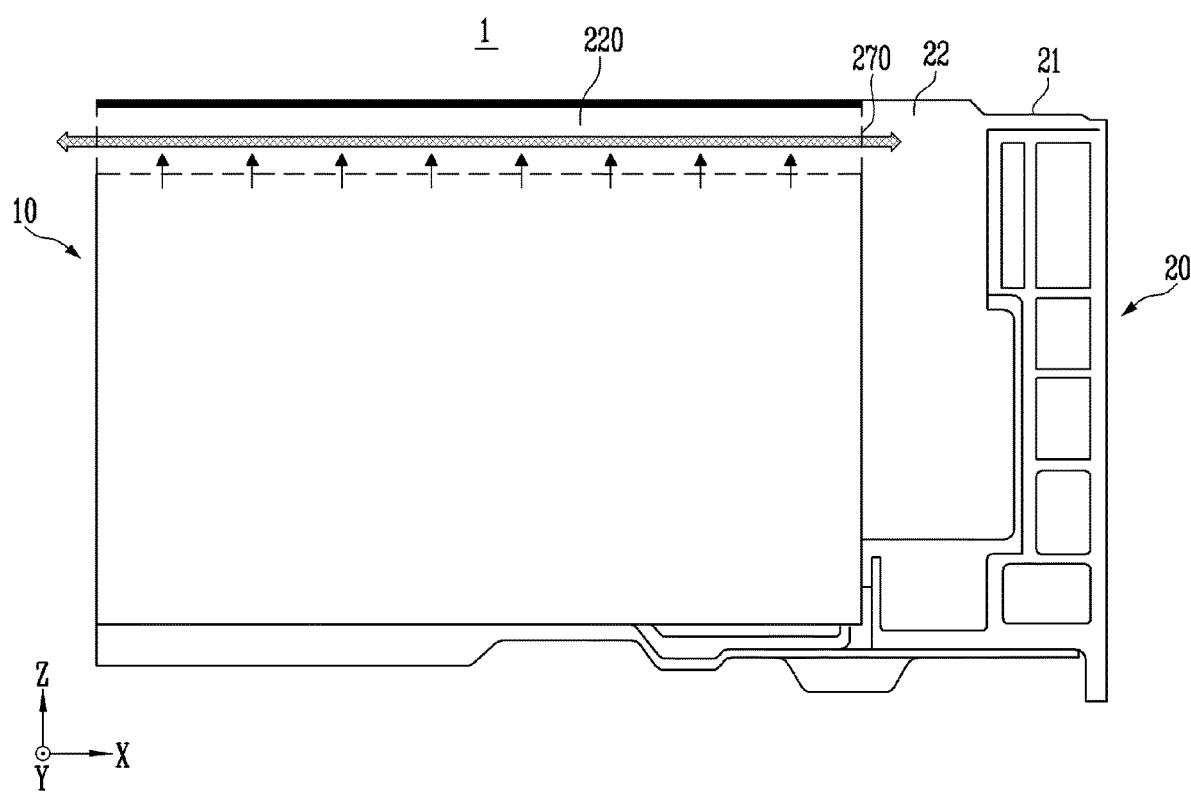
FIG. 10 is a diagram for explaining a cross-section of a battery pack according to an embodiment.
Figure 11:
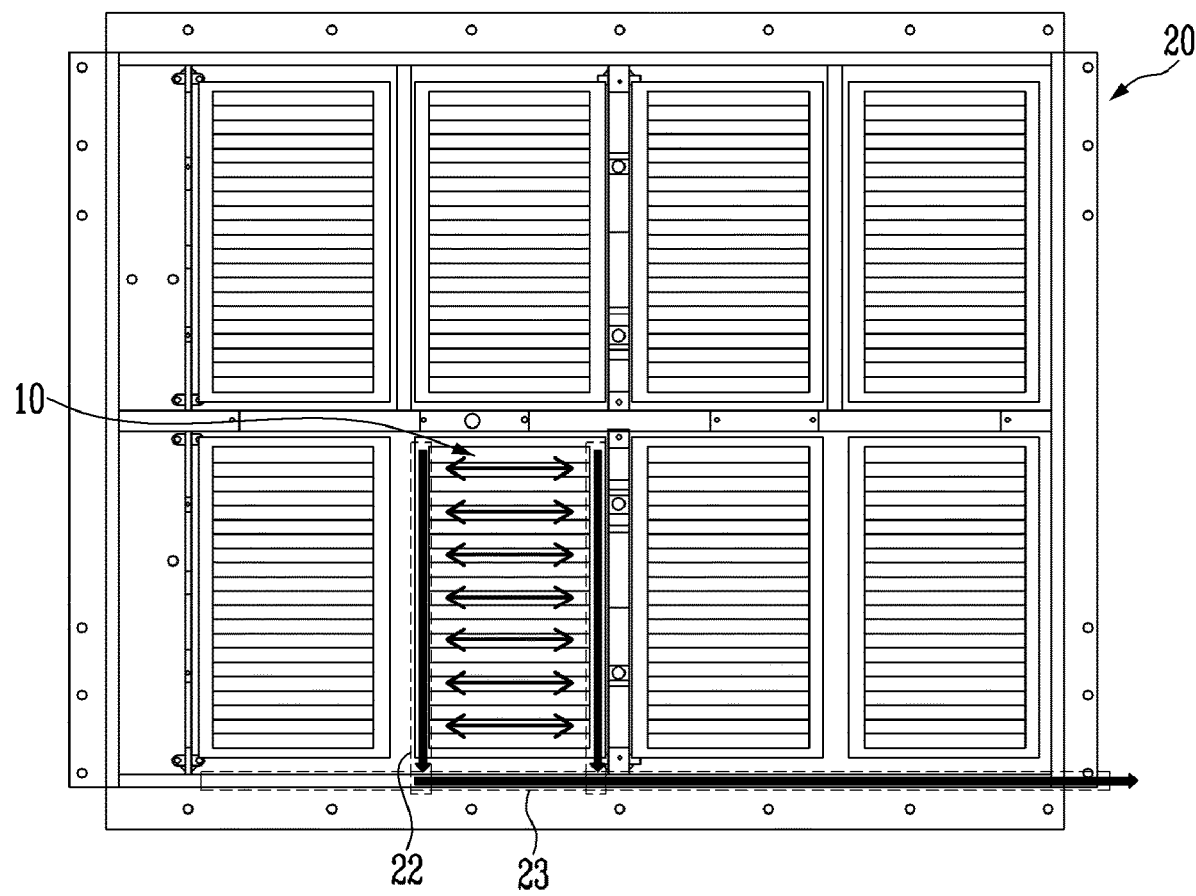
FIG. 11 is a diagram for explaining a battery pack according to another embodiment.

FIG. 9 is a diagram for explaining a battery pack according to an embodiment. FIG. 10 is a diagram for explaining a cross-section of a battery pack according to an embodiment. FIG. 11 is a diagram for explaining a battery pack according to another embodiment.

Referring to FIGS. 9 to 11, a battery pack 1 according to an embodiment of the present disclosure may comprise a battery module 10 and a pack housing 20.

A battery module 10 may be accommodated in the pack housing 20. One or more battery modules 10 may be accommodated in a pack housing 20. A battery module 10 may be disposed in a pack housing 20 and mounted to a pack housing 20 through bolts or the like.

A pack housing 20 may comprise a frame 21. A frame 21 may form a space for accommodating a battery module 10. A frame 21 may form an exhaust passage 22, 23. Therefore, a pack housing 20 may comprise an exhaust passage 22, 23. An exhaust passage 22, 23 may be connected to a space for accommodating a battery module 10.

In an embodiment, an exhaust passage 22, 23 may comprise a first exhaust passage 22. A first exhaust passage 22 may be connected through an outlet 270 to a flow channel 220 included in a battery module 10. In this case, a first exhaust passage 22 may be connected to outlets formed at the same side among all outlets 270 included in a battery module 10.

Referring to FIG. 9, in an embodiment, battery cells included in a battery module 10 may be stacked in the X-axis direction. In this case, flow channels 220 included in a battery module 10 may be formed in the Y-axis direction that is perpendicular to a stacking direction. Therefore, flow channels 220 may have a shape that is longer in the Y-axis direction.

A first exhaust passage 22 may be connected to flow channels 220. A first exhaust passage 22 may be positioned at one side of a battery module 10. A first exhaust passage 22 may be formed in the X-axis direction that is perpendicular to the direction of flow channels 220. Therefore, a first exhaust passage 22 may have a shape that is longer in the X-axis direction.

A first exhaust passage 22 may be connected to an exhaust hole of a pack housing 20. Accordingly, a gas generated from the battery cell 100 may be discharged to the outside through a corresponding flow channel 220 in a vent 200, a first exhaust passage 22, and an exhaust hole. Therefore, a gas generated in any one among a plurality of battery cells 100 may be discharged to the outside by sequentially passing through a corresponding flow channel 220 and a first exhaust passage 22.

Referring to FIG. 11, in an embodiment, an exhaust passage 22, 23 may further comprise a second exhaust passage 23. A second exhaust passage 23 may be connected in a direction that is perpendicular to a first exhaust passage 22.

Battery cells included in a battery module 10 may be stacked in the Y-axis direction. In this case, flow channels 220 included in a battery module 10 may be formed in an X-axis direction that is perpendicular to a stacking direction. Therefore, flow channels 220 may have a shape that is longer in the X-axis direction.

A first exhaust passage 22 may be connected to flow channels 220. A first exhaust passage 22 may be positioned at one side of a battery module 10. A first exhaust passage 22 may be formed in the Y-axis direction that is perpendicular to the direction of flow channels 220. Therefore, a first exhaust passage 22 may have a shape that is longer in the Y-axis direction.

A second exhaust channel 23 may be connected to a first exhaust passage 22. A second exhaust passage 23 may be formed in the X-axis direction that is perpendicular to the direction of a first exhaust passage 22.

A second exhaust passage 23 may be connected to an exhaust hole of a pack housing 20. Accordingly, a gas generated from a battery cell 100 may be discharged to the outside through a corresponding flow channel 220 in a vent 200, a first exhaust passage 22, a second exhaust passage 23, and an exhaust hole. Therefore, a gas generated in any one battery cell among a plurality of battery cells 100 may be discharged to the outside by sequentially passing through a corresponding flow channel 220, a first exhaust passage 22, and a second exhaust passage 23.

What is claimed is:

1. A battery module comprising:
a plurality of battery cells stacked in a first direction;
a module case accommodating the plurality of battery cells; and
a vent positioned on top of the plurality of battery cells along a height direction of the module case perpendicular to the first direction,
wherein the vent comprises a plurality of partitions forming a plurality of flow channels distinguished from each other and extended uninterruptedly along a second direction perpendicular to the first direction and the height direction of the module case.

2. The battery module according to claim 1, further comprising a plurality of thermal barriers each of which is disposed between battery cells barriers among the plurality of battery cells.

3. The battery module according to claim 2, wherein each of the plurality of thermal barriers is disposed at a bottom of a corresponding partition among the plurality of partitions.

4. The battery module according to claim 2, wherein at least one battery cell among the plurality of battery cells is disposed between adjacent thermal barriers among the plurality of thermal barriers.

5. The battery module according to claim 1, wherein each of the plurality of battery cells comprises a sealing portion to which an exterior material is bonded and which is folded, and
wherein each of the plurality of battery cells is disposed such that the sealing portion faces a vent.

6. The battery module according to claim 1, wherein each of the plurality of partitions has a height equal to or more than a reference value in the height direction of the module case.

7. The battery module according to claim 1, wherein the vent comprises a lower plate connected to each of the plurality of partitions in a direction that is perpendicular to each of the plurality of partitions, and
wherein the lower plate comprises at least one hole for each of the plurality of flow channels.

8. The battery module according to claim 1, wherein any one flow channel among the plurality of flow channels discharges to the outside a gas introduced from a battery cell corresponding to any one flow channel among the plurality of battery cells.

9. The battery module according to claim 1, wherein any one flow channel among the plurality of flow channels is formed within a vent to be separated from another flow channel among the plurality of flow channels.

10. The battery module according to claim 1, wherein the module case comprises an upper case and a lower case, and
wherein the vent is coupled to the upper case as an integrated component.

11. A battery pack comprising:
a plurality of battery modules each comprising a plurality of cells stacked in a first direction;
a pack housing accommodating the plurality of battery modules; and
a vent positioned on top of the plurality of battery cells along a height direction of the pack housing perpendicular to the first direction;
wherein the vent comprises a plurality of partitions forming a plurality of flow channels distinguished from each other and extended uninterruptedly along a second direction perpendicular to the first direction and the height direction of the pack housing, and
wherein the pack housing comprises an exhaust passage connected to each of the plurality of flow channels.

12. The battery pack according to claim 11, wherein any one flow channel among the plurality of flow channels discharges to the outside through the exhaust passage a gas introduced from a corresponding battery cell among the plurality of battery cells.

13. The battery pack according to claim 11, wherein the exhaust passage comprises:
a first exhaust passage connected to each of the plurality of flow channels and a second exhaust passage connected in a direction that is perpendicular to the first exhaust passage,
wherein a gas generated in any one battery cell among the plurality of battery cells is discharged to the outside by sequentially passing through a flow channel corresponding to any one battery cell among the plurality of flow channels, the first exhaust passage, and the second exhaust passage.

14. The battery pack according to claim 11, wherein the pack housing comprises a frame forming a space in which each of the plurality of battery modules is accommodated, and
wherein the exhaust passage is formed by the frame.

15. A battery module comprising:
a plurality of battery cells stacked in a first direction;
a module case accommodating the plurality of battery cells; and
a vent positioned on top of the plurality of battery cells along a height direction of the module case perpendicular to the first direction,
wherein the vent comprises a plurality of partitions forming a plurality of flow channels distinguished from each other and extended along a second direction perpendicular to the first direction and the height direction of the module case, and
wherein each length of flow channels along the second direction is equal to or greater than each length of the plurality of battery cells along the second direction.

16. The battery module according to claim 15, further comprising a plurality of thermal barriers each of which is disposed between battery cells barriers among the plurality of battery cells.

17. The battery module according to claim 15, wherein each of the plurality of battery cells comprises a sealing portion to which an exterior material is bonded and which is folded, and
wherein each of the plurality of battery cells is disposed such that the sealing portion faces a vent.

18. The battery module according to claim 15, wherein each of the plurality of partitions has a height equal to or more than a reference value in the height direction of the module case.

19. The battery module according to claim 15, wherein the vent comprises a lower plate connected to each of the plurality of partitions in a direction that is perpendicular to each of the plurality of partitions, and
wherein the lower plate comprises at least one hole for each of the plurality of flow channels.

* * * * *